Nov. 13, 1923.  1,473,691
C. H. YOUNG
STEERING MECHANISM FOR VEHICLES
Filed Jan. 2, 1923
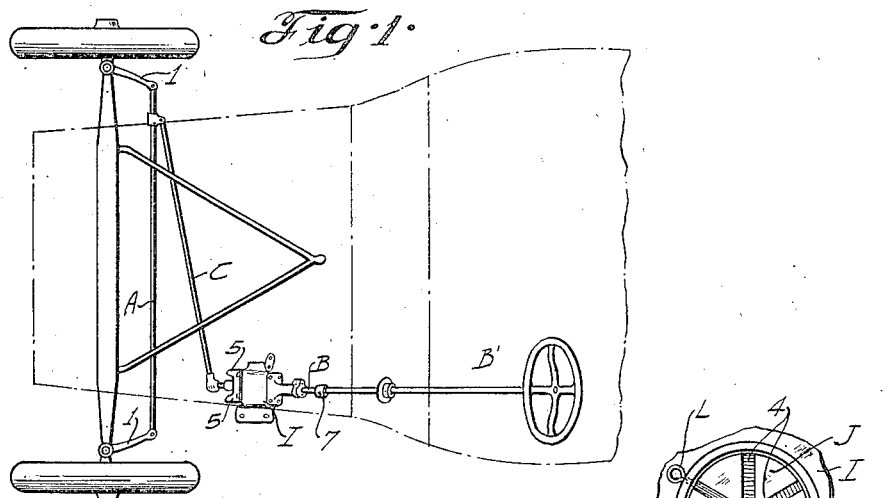
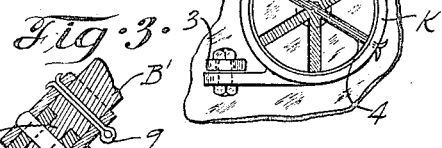
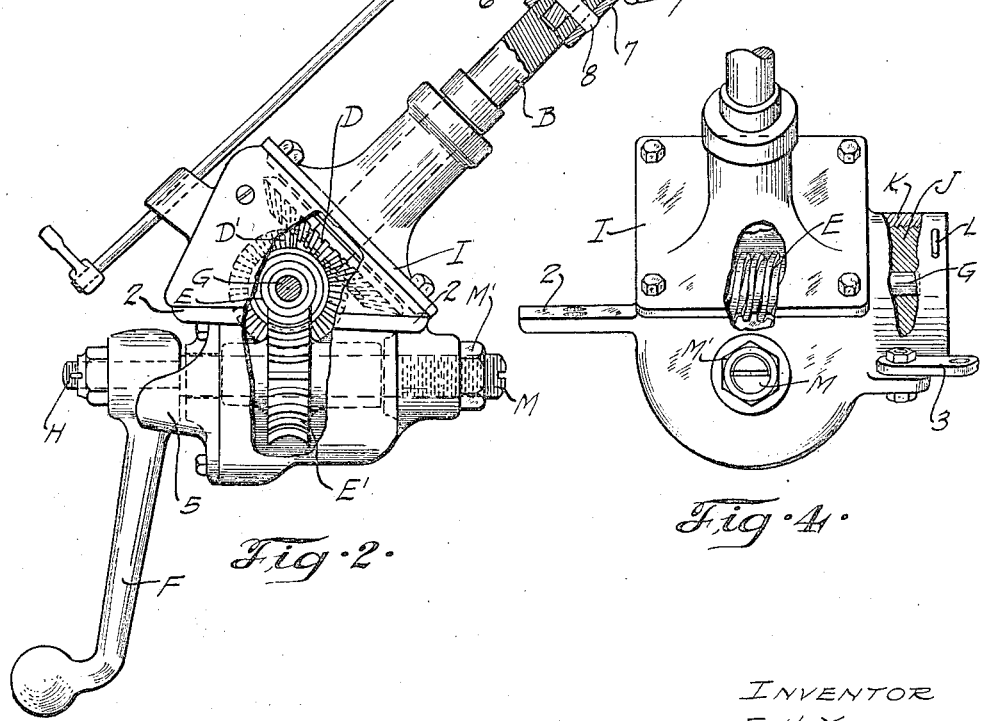
INVENTOR
C. H. Young.
By Bakewell & Church
ATTORNEYS Patented Nov. 13, 1923.

1,473,691

UNITED STATES PATENT OFFICE.

CLIFFORD H. YOUNG, OF ST. LOUIS, MISSOURI.

STEERING MECHANISM FOR VEHICLES.

Application filed January 2, 1923. Serial No. 610,221.

*To all whom it may concern:*

Be it known that I, CLIFFORD H. YOUNG, a citizen of the United States, residing at St. Louis, State of Missouri, have invented a certain new and useful Improvement in Steering Mechanisms for Vehicles, of which the following is a full, clear, and exact description, such as will enable others skilled in the art to which it appertains to make and use the same.

This invention relates to vehicle steering mechanisms of the type that comprise a drag link combined with a transverse connecting rod that is fastened at its ends to the steering knuckles of the front wheels.

The main object of my invention is to provide an irreversible steering mechanism of the type referred to that is inexpensive to manufacture, easy to install and of such simple design that it is not liable to get out of order when in use.

Another object is to provide a steering mechanism of the kind referred to that is equipped with a novel means for adjusting certain parts of the mechanism to compensate for wear and maintain said parts in such condition that there will be practically no lost motion in the mechanism. Other objects and desirable features of my invention will be hereinafter pointed out.

Figure 1 of the drawings is a top plan view of my improved steering mechanism.

Figure 2 is a side elevational view of said mechanism, with a portion of the housing broken away.

Figure 3 is a detail end elevational view of the adjustable thrust bearing for taking up the wear on the beveled pinions of the mechanism; and Figure 4 is a rear end elevational view of the mechanism, with a portion of the housing broken away to show the worm.

Referring to the drawings, A designates a transversely disposed connecting rod that is fastened at its ends to rearwardly-projecting arms 1 on the steering knuckles of the front wheels of the vehicle, B designates an inclined steering shaft and C designates a drag link arranged transversely of the vehicle and joined at one end to the connecting rod A. Movement is transmitted from the steering shaft B to the drag link C by a pair of intermeshing, beveled pinions D and D′, a worm E and worm gear E′ and a rock arm F. The pinion D, which is of considerably greater diameter than the pinion D′, is secured to the lower end of the steering shaft B, and the pinion D′ is connected to a horizontal shaft G that is arranged transversely of the vehicle at right angles to the steering shaft. The worm E is connected to said transversely-disposed shaft G and the worm gear E′ is connected to a horizontal rock shaft H that is arranged longitudinally of the vehicle or at right angles to the transverse shaft G, as shown in Figure 2, the rock arm F previously referred to being secured by any suitable means to the front end of the rock shaft H. The beveled pinions and the co-operating worm and worm gear above referred to are mounted in a housing, indicated as an entirety by the reference character I, which is of such construction that it can be easily connected to or disconnected from the chassis of an automobile or other power-operated vehicle. In the form of my invention herein illustrated the housing I is provided at one side with a laterally-projecting, rigid flange 2 that is adapted to be connected to one of the side members of the frame of the chassis and is provided at its opposite side with an adjustable, horizontally-disposed link 3 that is adapted to be connected to the cylinder block of the engine of the chassis.

In order that certain parts of the mechanism which are liable to wear may be adjusted to compensate for wear and thus take up the lost motion in the mechanism, means is provided for adjusting one of the beveled pinions relatively to the other so as to cause the co-operating teeth on said pinions to fit snugly, and a separate means is provided for adjusting the worm gear relatively to the worm, so as to compensate for wear on the thread of the worm and on the teeth of the worm gear. In the mechanism herein illustrated the means for taking up wear on the pinions D and D′ consists of a thrust bearing J adjustably mounted in a laterally-projecting sleeve K on one side of the housing I, and provided at its inner end with a recess or pocket which receives one end of the transversely-disposed shaft G to which the worm E and the pinion D′ are connected, said thrust bearing being formed by an externally screw-threaded plug that is screwed into the sleeve K. By screwing the bearing J farther into its supporting sleeve K, said bearing will exert an end-wise thrust on the shaft G in a direction to move the pinion D′ relatively to the pinion D, so as to compensate for the wear on the co-operating portions of said pinions. Any suitable means may be used for locking the thrust bearing J in adjusted position, but I prefer to provide the sleeve K with a transversely-disposed cotter key L that is arranged in such a position that it will lie in one of a plurality of transverse slots 4 in the outer end of the thrust bearing J. The rock shaft H that carries the worm gear E′ is arranged underneath the transverse shaft G to which the worm is connected, and the means for adjusting the worm and worm gear to compensate for wear on the co-operating portions of said elements consists of a screw M arranged in the housing I in such a way that it serves as a thrust bearing for one end of the rock shaft H, said screw being provided with a lock nut M′, as shown in Figure 2. By loosening the lock nut M′ and tightening the screw M the rock shaft H will be moved in a direction to cause the teeth on the worm gear E′ to bear snugly against the thread of the worm E. Accordingly, by adjusting the thrust bearing J and the screw M from time to time the co-operating parts of the mechanism which are most liable to wear can be maintained in such condition that there will be practically no lost motion in the mechanism. In order to prevent the rock arm F from overthrowing, the housing I is provided at its front side with a pair of stops 5 that limit the travel or lateral movement of the rock arm F.

In order to facilitate the installation of the mechanism, the steering shaft B is composed of two sections that are detachably connected together. In the form of my invention herein illustrated said steering shaft comprises a lower portion B provided at its upper end with a slot and an upper portion B′ provided at its lower end with a tongue 6 that projects into said slot, the joint between said portions B and B′ being surrounded by a sleeve 7 permanently connected to the lower portion B by a transversely-disposed pin 8 or other suitable means and detachably connected to the upper portion B′ by means of a transversely-disposed cotter pin 9 that is shown in Figure 2.

A steering mechanism of the construction above described has all of the desirable features and characteristics of the conventional irreversible steering mechanism that is now used on most power-operated vehicles; it can be installed easily on a vehicle to replace a steering mechanism that is not of the irreversible type; it can be manufactured at a low cost and it is of such simple design that it is not liable to get out of order when in use. In addition to the desirable features above pointed out such a steering mechanism can be easily kept in perfect mechanical condition by simply adjusting the thrust bearings J and M from time to time so as to move the pinion D′ relatively to the pinion D and the worm gear E′ relatively to the worm E to take up the lost motion between said parts produced by wear on the co-operating surfaces of same.

Having thus described my invention, what I claim as new and desire to secure by Letters Patent is:

1. A steering mechanism for vehicles, comprising an inclined steering shaft, a horizontally-disposed rock shaft arranged longitudinally of the vehicle and provided with a rock arm that is adapted to be connected to a drag link, and means for transmitting movement from said steering shaft to said rock arm comprising a pair of beveled pinions and a worm and worm gear.

2. A steering mechanism for vehicles, comprising an inclined steering shaft, a horizontally-disposed rock shaft arranged longitudinally of the vehicle and provided with a rock arm that is adapted to be connected to a drag link, a transverse shaft arranged between said steering shaft and said rock shaft at right angles to said rock shaft, co-operating gears on said steering shaft and said transverse shaft, and a worm on said transverse shaft that meshes with a worm gear on said rock shaft.

3. A steering mechanism for vehicles, comprising an inclined steering shaft, a horizontally-disposed rock shaft arranged longitudinally of the vehicle and provided with a rock arm that is adapted to be connected to a drag link, a transverse shaft arranged between said steering shaft and said rock shaft at right angles to said rock shaft, co-operating gears on said steering shaft and said transverse shaft, a worm on said transverse shaft that meshes with a worm gear on said rock shaft, means for taking up wear on the co-operating gears on the steering shaft and transverse shaft, and an independent means for taking up the wear on said worm and worm gear.

4. A steering mechanism for vehicles, comprising an inclined steering shaft, a horizontally-disposed rock shaft disposed longitudinally of the vehicle and provided with an arm that is adapted to be connected to a drag link, a transversely-disposed shaft arranged between said rock shaft and steering shaft at right angles to the rock shaft, means for transmitting rotary motion from said steering shaft to said transverse shaft, a worm and worm gear for transmitting motion from said transverse shaft to said rock shaft, and a housing for supporting said shafts and encasing said worm and worm gear.

5. A steering mechanism for vehicles, comprising an inclined steering shaft, a horizontally-disposed rock shaft disposed longitudinally of the vehicle and provided with an arm that is adapted to be connected to a drag link, a transversely-disposed shaft arranged between said rock shaft and steering shaft at right angles to the rock shaft, means for transmitting rotary motion from said steering shaft to said transverse shaft, a worm and worm gear for transmitting motion from said transverse shaft to said rock shaft, a housing for supporting said shafts and encasing said worm and worm gear, and adjustable thrust bearings in said housing for said transverse shaft and said rock shaft.

6. A steering mechanism for vehicles, comprising an inclined steering shaft, a horizontally-disposed rock shaft disposed longitudinally of the vehicle and provided with an arm for actuating a drag link, a transverse shaft operatively connected with said steering shaft, a worm and worm gear for transmitting motion from said transverse shaft to said rock shaft, a housing that encases said worm and worm gear, and a thrust bearing adjustably mounted in said housing and provided with a socket for receiving one end of said transverse shaft.

7. A steering mechanism for vehicles, comprising an inclined steering shaft, a horizontally-disposed rock shaft disposed longitudinally of the vehicle and provided with an arm for actuating a drag link, a transverse shaft operatively connected with said steering shaft, a worm and worm gear for transmitting motion from said transverse shaft to said rock shaft, a housing that encases said worm and worm gear, a thrust bearing adjustably mounted in said housing and provided with a socket for receiving one end of said transverse shaft, and an adjustable device in said housing that is adapted to exert an end thrust on said rock shaft, for the purpose described.

8. A steering mechanism for vehicles, comprising an inclined steering shaft, a horizontally-disposed rock shaft arranged longitudinally of the vehicle and provided with an arm for actuating a drag link, a transverse shaft arranged intermediate said steering shaft and said rock shaft at right angles to said rock shaft, co-operating gears on said steering shaft and transverse shaft, a worm on said transverse shaft that meshes with a worm gear on said rock shaft, a housing for encasing said gears and supporting said shafts, means on said housing for limiting the lateral movement of the arm on said rock shaft in opposite directions, a laterally-projecting sleeve on one side of said housing, an adjustable thrust bearing in said sleeve that receives one end of said transverse shaft, and means for locking said thrust bearing in adjusted position.

CLIFFORD H. YOUNG.